3,527,071
LOCKING DEVICE, IN PARTICULAR FOR THEFT
PREVENTION ON AUTOMOTIVE VEHICLES
Bertrand Antoine Warnod, 30 Rue Charles Laffitte,
Neuilly-sur-Seine, France
Original application Jan. 2, 1968, Ser. No. 695,158.
Divided and this application Jan. 23, 1969, Ser.
No. 793,253
Claims priority, application France, Oct. 5, 1967,
123,357
Int. Cl. E05b 65/12
U.S. Cl. 70—252                                    24 Claims

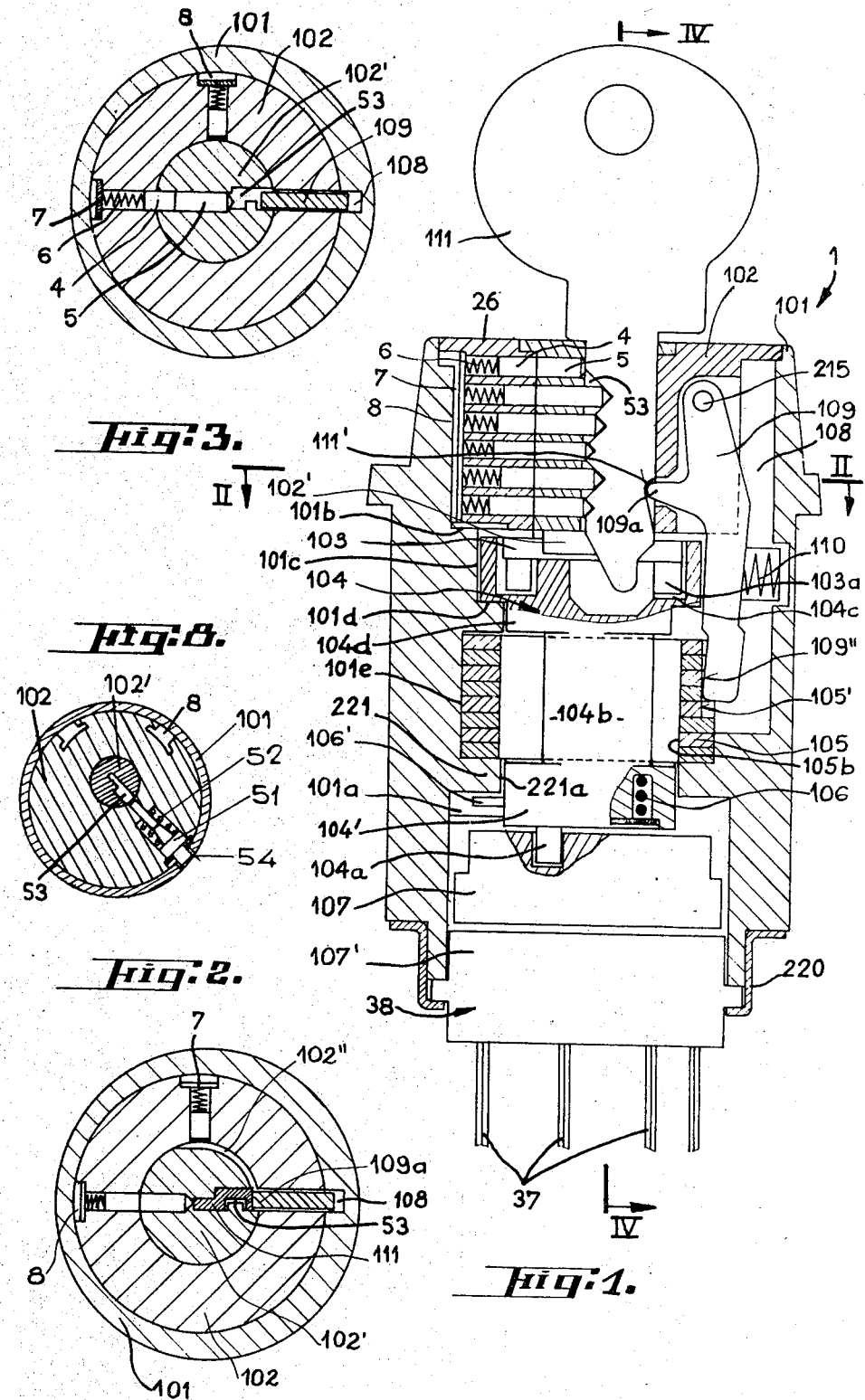

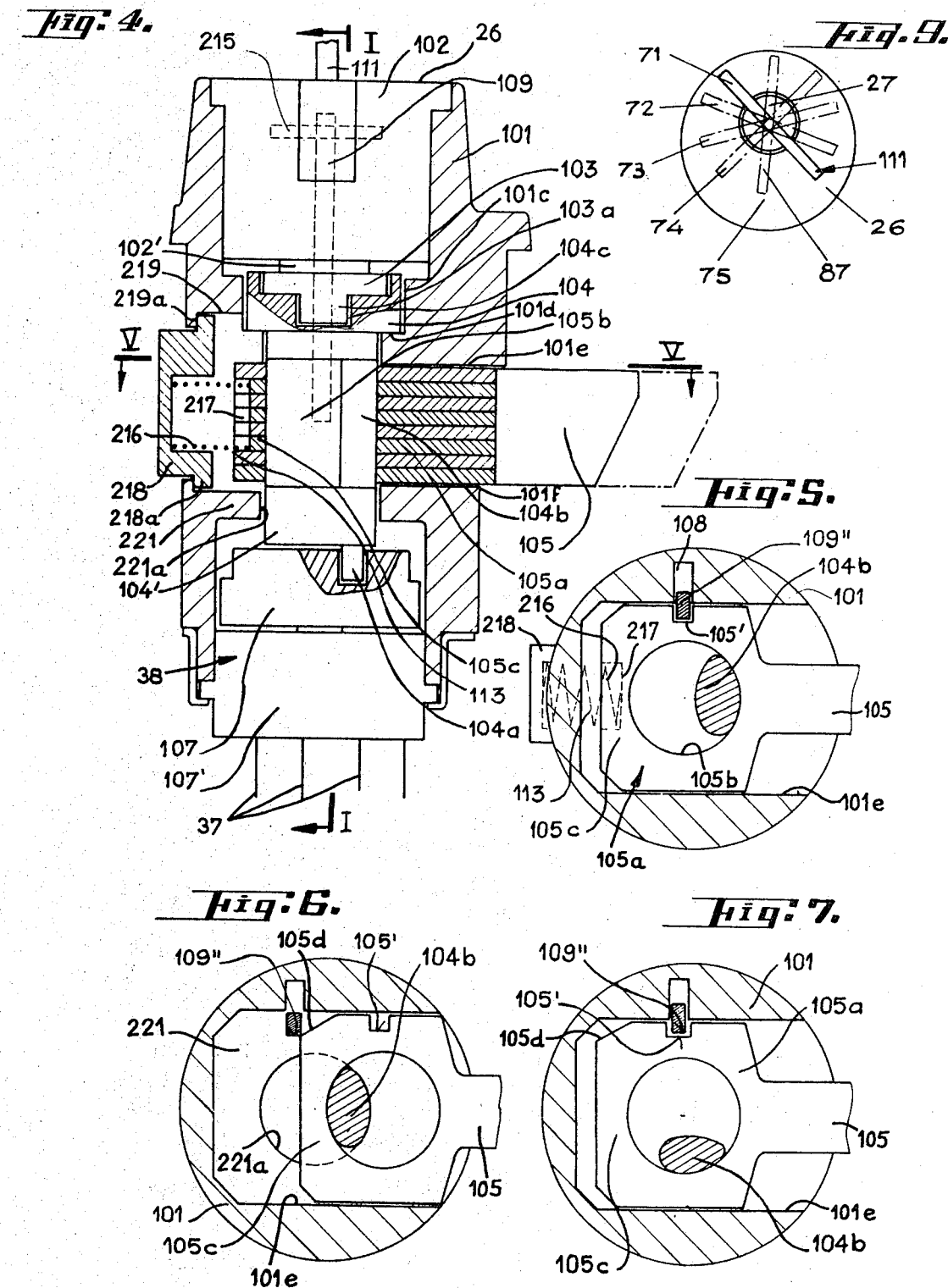

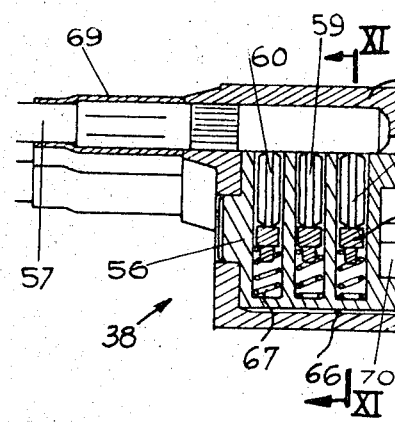
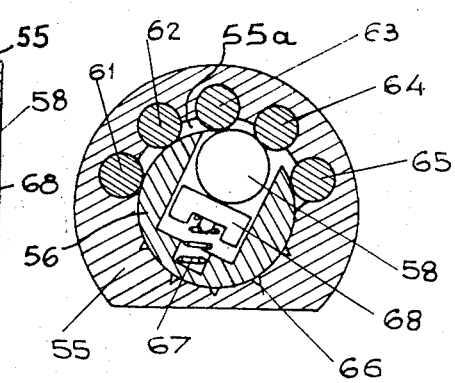
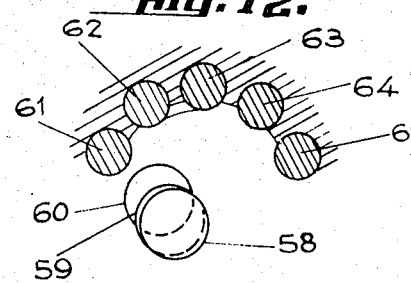
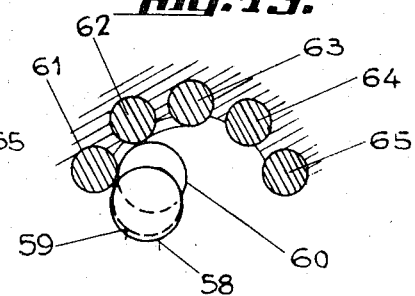
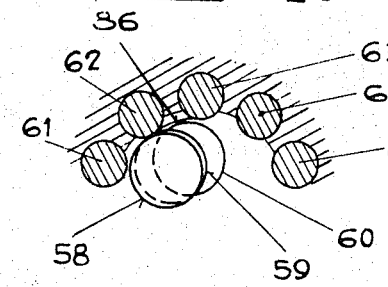
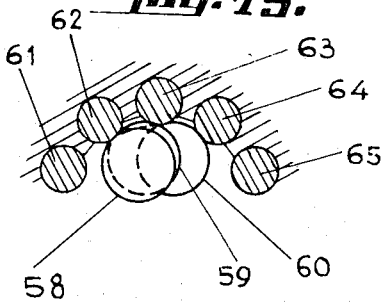
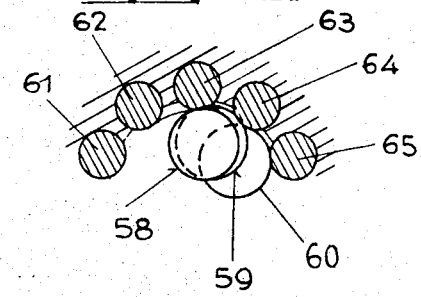
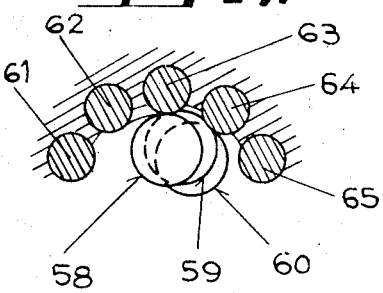
INVENTOR
BERTRAND ANTOINE WARNOD

United States Patent Office 3,527,071
Patented Sept. 8, 1970

ABSTRACT OF THE DISCLOSURE

An anti-theft device on a motor vehicle for locking the steering-wheel shaft while simultaneously breaking all electric circuits, comprising a cartridge-like assembly mounted in a socket-like holder integral with the steering-column and including a safety-lock operable by a removable key which may successively assume a "stop," a "parking," a "run," and a "start" position, a retractable snap-bolt actuated by said safety-lock and insertable, when extended, into a clasp integral with said shaft, and a rotary switch controlling at least the electric ignition and start circuits and operable in unison with said lock.

---

This is a division of the U.S. patent application Ser. No. 695,158, filed Jan. 2, 1968.

The present invention essentially relates to a releasable locking device for selectively securing a movable element against motion and is more specifically concerned with anti-theft or anti-joy ride appliances for use on any kind of land, floating or flying automotive vehicle, such as for example automobiles and motor cars, motor boats and aircrafts, driven for example by an electrically started engine, such as an internal combustion either spark ignition or Diesel engine, the operation of which is preferably responsive to at least one electric control circuit. Such devices are intended to prevent any unauthorized use of said vehicles when the latter are at rest with the engine stopped. Said devices may, of course, be also used on stationary equipments or systems, such as various kinds of machines and apparatus, as well as on any kind of closures, such as doors, windows, safe-deposit boxes, covers, panels, shutters, and the like.

One main object of this invention is therefore to provide a device of the type set forth hereinabove, which forms a removable cartridge-like unit of a very small size and which is adapted to lock an essential mechanical part, appliance or arrangement, more especially in a vehicle, such as the steering-wheel shaft or spindle or the gear-shift lever or the brake lever while simultaneously breaking or opening any electric control circuit requisite for starting or running the vehicle.

Consequently, a further object of the invention, is to provide an anti-theft device wherein the locking mechanism is coupled or combined with the control means for the starting circuit or for the fuel injection or feed pump for example, said device being operable preferably by means of a removable hand-actuated member and only by the latter.

Still another object of the invention is to provide a device of the type referred to hereinabove which is adapted to be mounted in any desirable relative position without limiting or restraining the orientation of the housing accommodating said device, so that the latter may be secured in any selected location for example on the casing, sheath or ornamental jacket of the steering-column in the gear-box or on the brake.

For this purpose, the device according to the invention comprises a cartridge-like assembly adapted to be removably inserted and housed within a socket-like holder or support, rigidly affixed to a stationary structure, for example to the steering-column and including a safety-lock consisting of a stationary body, of a substantially cylindrical plug rotatably mounted in said body and formed with an axial keyhole and of a key-responsive spring-loaded pin or disk-tumbler mechanism housed in said body and engageable with said plug for locking same, whereby said plug is operable only by a removable key for being reversibly turned into any one of several spaced angular set positions from and to a first outgoing locking, so-called "stop" position; an elongated snap-bolt slidably mounted in a fixed structure associated with said safety-lock for longitudinal motion between an operative outside projecting locking position and an inoperative inwards retracted position, said snap-bolt being loaded by a biasing spring urging said snap-bolt towards its operative outwards moved position; a rotary bolt-actuating member operatively connected to said plug and adapted to co-operate with said snap-bolt for retracting same into its inoperative position through rotation of said key from its "stop" position; and spring-loaded bolt-catch means movably mounted in said body for automatically engaging a corresponding stop portion on said snap-bolt in the inoperative retracted position of the latter, so as to positively and irreversibly retain same therein for any angular position of the key remaining in said plug, said key being engaged by said catch means in said "stop" position until withdrawal of said key, causing said catch means to be tripped for disengaging and releasing said snap-bolt.

Preferably, the device or assembly according to the invention also comprises a rotary electric switch associated with said safety-lock and operable in unison with the latter by said key for controlling one or several electric circuits, such as for example an ignition circuit and a starting circuit. The rotary system of the device according to the invention may therefore preferably assume at least four successive separate angular positions, namely:

(1) A first or "stop" position wherein the key is removable from said safety-lock, said snap-bolt is ready, upon withdrawal of said key, to spring into its operative outward extended position, locking for example the steering-wheel shaft, and all electric circuits are open;

(2) A second or "parking" or "idle" position, wherein said key is still removable from said safety-lock, said snap-bolt is positively retained in its inoperative retracted position thereby unlocking said steering-wheel shaft, and all electric circuits remain broken;

(3) A third or "run" or "contact-making" position, wherein said key is positively retained within said safety-lock, said snap-bolt is still positively retained in its inoperative retracted position and one electric circuit, in particular the ignition circuit, is closed or switched on, whereas the other or starting circuit remains open;

(4) A fourth or "start" position wherein said key is still positively retained within said safety-lock, said snap-bolt is also still retained in its inoperative retracted position, said ignition circuit remains open and said starting circuit is switched on.

The device according to the invention is simple of construction, economical in manufacture, efficient and reliable in operation.

The invention will be better understood and other objects, features and advantages thereof will appear as the following detailed description proceeds, with reference to the accompanying diagrammatic drawings, given only by way of example, illustrating an embodiment of this invention, and wherein:

FIG. 1 is a view of the anti-theft device according to the invention, in longitudinal section taken upon the line I—I of FIG. 4, showing the snap-bolt in its retracted inoperative position;

FIG. 2 is a cross-section taken along the line II—II of FIG. 1, showing the co-operation of the bolt-catch with the key;

FIG. 3 is a view similar ot FIG. 2, but with the key having been withdrawn;

FIG. 4 is a longitudinal cross-section taken upon the line IV—IV of FIG. 1;

FIG. 5 is a fragmentary view in cross-section taken along the line V—V of FIG. 4 and showing the snap-bolt positively retained by its catch in the retracted inoperative position, when the key is in the "stop" position;

FIG. 6 is a view similar to FIG. 5, but showing the snap-bolt released upon withdrawal of the key and having moved outwards to its operative locking position;

FIG. 7 is a view similar to FIG. 5 or 6, showing the snap-bolt in its retracted inoperative position when the key is withdrawn in its "parking" position;

FIG. 8 is a cross-section through the safety lock mounted in its housing or casing with the locking finger securing and restraining the safety-lock being shown engaged in the hole of the casing wall, in the state corresponding to the "parking" position of the key;

FIG. 9 is an external end view of the top face of the anti-theft device, illustrating the various possible angular positions of the key;

FIG. 10 is a longitudinal sectional detail view on an enlarged scale of the electric switch shown on FIG. 1;

FIG. 11 is a cross-section taken upon the line XI—XI of FIG. 10;

FIG. 12 is a diagrammatic fragmentary cross-sectional partial view similar to FIG. 11 showing the electric with its free moving roller contacts in its open position corresponding to the "stop" position of the key, wherein all circuits of the vehicle are cut out;

FIG. 13 is a view similar to FIG. 12, showing the position of the movable roller contact for the "outfits" position of the key wherein they close the auxiliary circuits, for instance the radio circuit of the vehicle;

FIG. 14 is a view similar to FIG. 13 or 12, showing the position of the movable roller contacts for the "parking" position of the key, wherein they cut out or open all the electric circuits;

FIG. 15 is a view similar to FIGS. 12 to 14, showing the position of the movable contact rollers for the "run" position of the key wherein the ignition circuit is closed;

FIG. 16 is a view similar to FIGS. 12 to 15, showing the position of the moving contact rollers for the "start" position of the key wherein the ignition circuit and the starting circuit are both closed;

FIG. 17 is a similar view showing an intermediate position of the contact rollers during the return motion of the key from the "start" position.

Referring now to FIGS. 1 to 4 of the drawings, the reference numeral 1 generally denotes the device according to the invention for locking for example a steering-wheel spindle mounted in the hollow or tubular steering-column of a motor vehicle, surrounding with clearance the steering-wheel shaft or spindle which is freely rotatable therein and carries a sleeve-like part forming a slotted bolt-clasp surrounding said shaft and integral therewith by being for example welded thereto. Said sleeve or bush is formed on its side wall with at least one slot or like opening adapted to receive therein the free outer end or tip of the snap-bolt 105 of the locking device 1 when said snap-bolt is in its extended operative locking position shown in dash-dotted lines on FIG. 4 (wherein the solid lines show the snap-bolt in its inoperative retracted position). A socket-like bracket or holder is rigidly secured as by welding to the outside of the steering-column in substantially registering relationship with an aperture provided in the wall of said steering-column for the passage of the snap-bolt 105. This registering relationship should preferably be achieved for a slight turning angle of lock of the steering-wheel.

The assembly removably housed in said socket-like bracket or holder comprises a generally cylindrical or cartridge-like casing 101 for housing a cylinder-type safety lock, the snap-bolt and the electric rotary switch. This casing is slidably fitted into the holder and provided at its outer end with a peripheral flange abutting against the corresponding end of the holder to prevent said casing from moving further inwards into said holder. After its insertion into said holder, the casing is locked in place by a special locking system. A clamping screw extends through a corresponding hole of the tubular wall of the holder and is threaded radially into the casing so as to remove any mounting play or lost motion of the assembly. This casing is of somewhat tubular or hollow construction, the cavity of which opens to the outside through both opposite ends of the casing. The safety-lock, consisting of the stationary body 102 and of the inner cylinder or plug 102', is inserted into a corresponding bore of the casing 101 at one end thereof, said axial bore being limited by an inner annular shoulder or ledge 101b of the cavity of the casing 101 whereas the corresponding end thereof is closed by a peripheral flange of the body 102 fitted into a spotface or like recess of said casing so that the top face of said body is in flush relationship with the end face of the casing.

In a longitudinal bore of the body 102 is rotatably mounted the cylinder or plug 102' formed with a keyhole 53 adapted to receive a specially contoured key 111 by means of which and only thereby, the plug may be turned owing to the presence of a special plug-locking mechanism which may be of the pin-tumbler or of the disk-tumbler type. FIGS. 1, 2 and 3 show the pin-tumbler mechanism comprising for example six segmented spring-loaded pins consisting each one of a pair of aligned pin segments 4, 5 slidably mounted in a pair of radial bores respectively provided in the body 102 and in the plug or in a cylinder 102' of the safety-lock and which, upon rotation of said plug, may be brought into registering relation to each other. The pin segments and their corresponding radial bores in the plug are of differing lengths and are loaded each one by a spring 6 located within the corresponding bore in the body and acting upon the pin segment 4. Each radial bore extends fully through the wall of the body and plug, respectively, so as to open through the lateral radially outer and inner surfaces defining said wall. The pins and their springs are insertable through the orifices of said radial bores in the radially outer lateral surface of the body and are kept in position therein by a retaining slip or strip 7 slidably mounted in a corresponding longitudinal grootve 8 formed in the outer periphery of said body, which groove may be either of rectangular cross-section as shown on FIGS. 2 and 3 or of dovetailed cross-section. The slip or strip 7 is restrained either by a removable cap or cover affixed to the upper end of the body 102 or by a peripheral flange of said body (FIG. 1) whereby the groove 8 is closed at its upper end, whereas its lower end may be either blind or closed by a stationary abutment or by a shoulder of the structure surrounding said body. Since the radial bores in the plug open each one into the keyhole, each pin segment 5 is urged by its associated spring 6 to project into the keyhole 53 in the absence of the key 111 as shown on FIG. 3, whereby the inner cylinder or plug 102' is prevented from rotating because the radially outer pin segments 4 extend into the plug thereby locking it securely. When the correct key 111 is inserted into the keyhole, as shown on FIGS. 1 and 2, each notch or ward of the key has pushed back the radially inner pin-tumbler segment 5 outwards to the lateral surface of the plug so that all the joints between the pairs of pin segments 4, 5 are all located within the interface between body and plug. Hence, the plug is free to rotate. In the position of the key 111 and inner cylinder or plug 102' shown on FIGS. 1 and 2, which corresponds to the aforementioned first or 'stop' position, the key may be easily removed or withdrawn from the keyhole since the radially inner pins 5 are freely slidable in their respective registering radial bores within the plug 102' and the body 102. When the key, hence the plug is turned to any other angular position, said radial bores in the plug come out of alignment and are no longer registering with their corresponding radial bores within the body 102, so that each pin segment 5 is retained in position by its engagement with the inner plain lateral surface of the body 102 whereby said pin segments 5 which are thus fixedly engaging the corresponding wards or notches of the key 111, lock said key within the plug 102' and prevent it from being withdrawn unless the plug 102' is returned by rotating the key to said "stop" position.

However, it should desirably be possible to also remove the key in the second or so-called "parking" position thereof, said position being usually spaced by about 90° from the first or "stop" position, so that a second pin- or disk-tumbler mechanism will generally be provided in said "parking" position, as shown on FIGS. 2 and 3. Therefore, the key is removable from the plug only in two angular positions thereof while being securely locked therein in any other angular position.

It should be noted that as soon as the rotary assembly of the whole device has been returned by the torsion spring 106 into the "run" position from the "start" position, said spring does no longer exert any action upon the member 104'. It will further be readily appreciated that due to the arrangements for automatically locking the body 102 in place within the casing 101 or the latter within its holder as soon as either one has been fully inserted in position, it is impossible to remove same without making use of a suitable key 111, so that only the owner of such a key may remove the anti-theft device or safety-lock.

The snap-bolt 105 is movable substantially at right angles to the axis of rotation of the plug 102' and slidably mounted in a slide-way 101e formed into said casing 101 at an intermediate portion of the inner cavity thereof and extending transversely of said casing, said slide-way opening to the outside through an orifice 101f (FIG. 4) of said casing and said snap-bolt 105 always projecting therethrough.

The snap-bolt 105 is formed with a narrow front or outside projecting locking nose and with an enlarged or widened, flat rear guide portion 105a having two parallel opposite straight sides slidably engaging said guideway or slide-way 101e within the casing 101, one of said straight sides being formed with a stop notch 105' for receiving the aforementioned bolt-catch means and merging rearwards or at the inner end of said straight side into a bevelled or skew end portion 105b serving as a guide ramp for said bolt-catch means. The bolt 105 preferably consists of a fabricated stack of joined-up laminations shaped to the desired contour of said snap-bolt.

The snap-bolt 105 is permanently loaded by a biasing helical thrust spring 216 engaging by one end thereof a socket-like recess 217 formed in the innermost end face 105c of said snap-bolt and by its opposite end, a flanged cup-shaped spring-chair or seat 218 (FIGS. 4 and 5) slidably mounted in a side bore 219 of the casing 101, so as to project outwards therefrom under the thrust reaction of said spring, the flanged portion 218a of said spring-chair being adapted to engage from inside, at the end of its outward stroke, mating retaining stop means 219a integral with said casing and formed for example by a corresponding inner counter-flange or shoulder of said side bore 219. Owing to this arrangement, the casing 101 may be securely locked in place within the socket-like bracket or holder secured for example to a steering-column, since during the insertion of the casing into the tubular or cylindrical socket of said holder, the normally outwards projecting spring-chain 218 may be pushed inwards until it is in flush relation to the lateral outer surface of said casing whereas after the latter has been fully inserted in said holder, the spring-chair 218 snaps into a corresponding recess of said holder under the action of the thrust-spring 216, thereby securely connecting the casing to the holder.

FIG. 8 shows an arrangement for securely locking the body 102 in place within the casing 101. This arrangeincludes a locking tappet or finger 51 slidably mounted for longitudinal motion within a radial bore extending through the wall of the body 102 so as to open through its lateral inner and outer surfaces, respectively. A helical spring 52, surrounding the finger 51, is located between a bottom inner shoulder of said bore and a collar integral with said finger so as to urge the latter radially outwards. The finger 51 is retained within the body 102 by a washer or like fastener inserted in a spotface of the lateral outer surface of the body 102. In the fully outwards extended position of the finger 51, wherein said finger abuts by an integral shoulder or collar thereof against said washer or fastener, the radially outer end of said finger is inserted into a corresponding through-hole 54 of the side wall of said casing 101 whereas said finger 51 is engageable by its opposite or radially inner end with the lateral outer surface of the plug 102' before leaving the hole 54. At the level of said finger 51, the keyhole 53 opens through the lateral peripheral surface of the plug 102' and may be engaged by the radially inner end of the finger 51 when the latter is pushed radially inwards therein in the absence of the key, when the keyhole registers with the finger 51. The angular position of the radial finger 51 is so selected within the body 25 about the axis of rotation of the plug 27 that the keyhole opening registers with said finger in the "parking" position of the rotary assembly.

To insert either the casing 101 into its holder or the safety-lock 102 into the casing 101 or to remove either of them, the proper key 111 should be inserted into the keyhole 53 and turned to the "parking " position wherein the snap-bolt is still in its inoperative retracted position.

The enlarged portion 105a is formed with a substantially circular through-orifice 105b extending parallel to the axis of rotation of the plug 102'.

The rotary electric switch 38 is mounted within a corresponding substantially coaxial bore provided in that end of the casing 101 which is opposite to the safety-lock enclosing end thereof. This switch may be secured to the casing 101 by means of a removable cup-like annular cover or cap 220 through which the switch stator 107' projects at least partially outwards. The snap-bolt 105 is therefore positioned between the safety-lock 102, 102' and the switch 38. The rotary switch 38 may be of the type described hereinafter with reference to FIGS. 10 to 17. Alternatively, the switch rotor 107 may consist of a disk-shaped element rotatably mounted in substantially coaxial relation to the axis of rotation of the plug 102' on a shaft (not shown) supported by said switch stator 107', said switch rotor carrying, on its end face adjacent to the corresponding end face of the stator 107′, moving contact pieces (not shown) resiliently engageable with stationary contact pieces provided on said stator 107′. The contact pieces may consist of banked contact segments, wafers or like fanning or connecting strips or plates and the electric wiring may be connected in the conventional manner to the stator 107′.

There is provided a spring-loaded bolt-catch means adapted to positively and irreversibly retain the snap-bolt in its inoperative retracted position. The bolt-catch means may consist here of a rocking or tilting snap-latch member or lever 109 accommodated in a recess 108 of the body 102 and pivotally connected thereto as by a pivot pin 215 journalled or otherwise fastened in suitable bearing means or like attachments within said body. The lever 109 generally extends in at least approximate parallel relation to the axis of rotation of the plug 102′ so that the lever may effect a swinging motion substantially in a plane passing through said axis of rotation. One free end portion 109″ of said lever is engageable with the stop notch 105′ formed sidewise on said snap-bolt 105 in the fully retracted position of the latter, as shown on FIGS. 1, 5 and 7. During its swinging motion the lever 109 also moves within a corresponding longitudinal open slot of the casing, which corresponds to the recess 108. A coil spring 110 seated within a suitable recess in the casing 101, permanently exerts a sidewise or transverse force upon the lever 109, to urge it into engagement with the snap-bolt, as shown in FIG. 1. The lever 109 is formed with a sidewise or radially projecting portion 109a adapted to cooperate with the key 111 which is formed with a bolt-triggering off portion that, upon withdrawal of said key, engages and trips the latch lever 109. For this purpose, the key 111 has the back edge of its web or bit, which is opposite to its wards, formed with a notch or like indentation 111′ for receiving therein the radially projecting portion 109a of the latch lever 109 when the key is in the keyhole 53 and said latch lever is in its released position. The notch 111′ of the key 111 is followed, towards the tip of the key, by an adjacent raised edge portion connected to said notch preferably by a sloping rounded part and which forms said bolt-triggering off portion of the key. Thus the radially projecting portion 109a may extend at least partially into the keyhole through corresponding registering apertures in the body 102 and plug 102′. The angular position of said latch lever 109 about the axis of rotation of the plug 102′ is such that it registers substantially with the back web edge of the key 111 in the "stop" positon of the latter.

To assist the engagement of the projecting tit 109a with the key 111, the plug 102′ is formed at the level of said projecting tit, with a circumferential groove 102″ extending along a portion of the periphery of the plug so as to enable the tit 109a to move as near the notch 111′ as possible and to allow the plug 102′ to act as a cam with respect to said lever projecting portional tit 109a when the plug is turned by the key, as shown on FIG. 2. The respective relative positions or locations of the pivotal connection 215, of the projecting portion 109a and of the spring 110 may of course differ from that shown on FIG. 1 provided that they meet the operating requirements set on the lever 109. In the illustrated example, the pivotal connection 215 is located at one end of the lever 109 whereas the projecting portion 109a of the lever is positioned between the biasing spring 110 and said pivotal connection 215.

The rotary bolt-actuating member, for retracting the snap-bolt, generally denoted by the reference numeral 104 on FIGS. 1 and 4, is operatively connected by means of a dog-plate or like claw-coupling 103 to a corresponding extension of the plug 102′ axially projecting from the relevant end face of the body 102. The dog-plate 103 is provided with dogs, claws, feathers, splines or like clip elements 103a engaging corresponding holes or recesses 104c provided on the meeting end of the bolt-actuating member 104. Said bolt-actuating member 104 is formed at its end adjacent to said dog-plate 103 with a stepped barrel portion 104d rotatably mounted in a corresponding stepped bore 101c forming part of the cavity within the casing 101, whereby said stepped barrel portion 104d bears through a corresponding shoulder against an inner collar-like annular flange or mating shoulder 101d of said stepped bore, so that the bolt-actuating member 104 is thus properly supported in the axial direction and rotatably guided in the radial direction within the casing 101. This arrangement prevents any direct access to the snap-bolt through the keyhole when the key has been removed, thereby avoiding any possibility of picking or forcing the locking device by means of a tool or implement inserted within and through the keyhole. The bolt-driving portion proper of the bolt-actuating member 104 consists of an eccentric drive peg, dog-pin, striker stem or like tappet or wiper element 104b extending through the circular orifice 105b of the snap-bolt in substantially parallel relation to the axis of rotation of the plug 102′ and slidably engageable, when revolving about said axis, with the edge of said orifice in tangential relationship therewith, the eccentricity of said peg with respect to said axis of rotation being such as to cause full retraction of the snap-bolt 105 in the rearward innermost position of said peg with respect to the inward motion of said snap-bolt. This drive peg 104b is integral with and depends from the aforementioned barrel portion 104d of said bolt-actuating member and has preferably a substantially oval-shaped cross-sectional contour at least on that portion thereof which extends through the orifice 105b of said snap-bolt, as shown on FIGS. 5, 6 and 7. The bolt-actuating member is so designed as to fully retract said snap-bolt 105 into its inoperative position before passing the angular set or "parking" position next to said "stop" position when turning said key away from the latter and to leave said snap-bolt in its inoperative retracted position for any angular position of said key beyond said "parking" position.

Between the cavity accommodating the rotary switch 107, 107′ and the cavity housing the snap-bolt 105, the casing 101 is provided with a transverse partition 221 (FIGS. 1, 4 and 6) formed with a substantially circular aperture 221a extending through said partition in substantially coaxial relationship with the axis of rotation of the plug 102′. The drive peg 104b preferably extends fully throughout the whole thickness or height of the snap-bolt 105 and is integral, at its lower or bottom end, with a second cylindrical barrel portion 104′ extending in coaxial relation to the axis of rotation of the plug 102′, through the aperture or bore 221a into the space containing the switch 38, said lower barrel portion 104′ being preferably guided in its rotary motion by the wall or edge of said orifice or bore 221a which thus forms a kind of bearing therefor. Thus the partition 221 and the lower barrel portion 104′ also form a barrier preventing any direct access from below to the snap-bolt when the rotary switch has been withdrawn from the casing 101. The lower barrel portion 104′ is formed endwise with a dog-pin-like projection 104a inserted in a corresponding recess of the switch rotor 107 for turning same in unison with the bolt-actuating member. Said dog-pin projection 104a may either be located in eccentric relation to the axis of rotation of the plug 102′ as shown on FIGS. 1 and 4 or it may be coaxial therewith in which case it is preferably provided with a substantially cross-shaped end operatively engaging a complementary or mating recess or hole of the switch rotor 107 to achieve a positive drive thereof. The lock body 101 is provided at its bottom end with a suitable opening for the passage of the electrical connecting cables, leads or conductors 37 leading to the switch 38.

A torsion spring 106 formed preferably of a helical spring, coiled in substantially coaxial relation with the axis of rotation of the plug 102′, is housed within a suitable annular recess provided in the lower barrel portion 104′ as shown on FIG. 1 for automatically returning the whole rotary assembly of the locking device from the "start" position to the "run" position. For this purpose, the torsion spring 106 which is non-rotatably mounted within the lower barrel portion 104′ exhibits a sidewise projecting end 106′ engageable with a stationary abutment 101a integral with the casing 101 when the rotary assembly reaches the "run" position upon rotating towards the "start" position so that when keeping on rotating past said "run" position, the spring is increasingly stressed until the "start" position is reached, so that the spring 106 acts as a return-spring for urging said rotary assembly back from the aforementioned "start" position to the aforesaid "run" position upon release of said key, said spring being stretched only during the reverse rotation of said assembly from said "run" position to said "start" position.

The operation of this locking device is the following:

Assuming initially the configuration of the parts shown on FIGS. 1, 4 and 5, with the key 111 inserted in the keyhole 53 in the "stop" position of the plug 102′ and wherein the snap-bolt is retained in its inoperative fully retracted position by the catch lever or detent 109 engaging the stop notch 105′ of the bolt while the sidewise projecting portion 109a protruding under the push action of its biasing spring 110 into the keyhole 53 and into the confronting notch 111′ of the key 111 remaining in the keyhole to enable said lever to be rocked inwards to its greatest possible extent, when the withdrawal of the key is initiated, the raised edge portion of the key following the notch 111′ pushes the lever 109 back or aside when sliding past the lever projection 109a whereby the lever end portion 109″ is moved out of and disengages the stop notch 105′, so that the snap-bolt is released and springs forward to snap into its extended operative position through the action of its thrust-spring 216, as shown on FIG. 6. If the steering-wheel shaft is in a position where the slot of its bolt-clasp is not in front of the snap-bolt 105, the shank of the latter, under the thrust of its spring 216, engages the outer surface of said clasp until said slot thereof registers with the bolt so that the latter may project therethrough and come in its fully operative extended position shown in dash-dotted lines on FIG. 4 and also in FIG. 6. The outward travel of the snap-bolt 105 is limited by the engagement of the rearmost edge portion of its circular orifice 105b with the drive peg 104b, and as soon as the key has moved out of engagement with the lever projection 109a, the lever 109 is swung backwards by its biasing spring 110 so as to project into the slide-way of the snap-bolt 105, whereby its bottom end or lower tip portion 109″ comes immediately behind the stop portion formed by the free inner transverse end face or edge of the bolt shank 30, so that the bolt is positively prevented from moving backwards and out of the bolt-clasp. When the key is now inserted again into the safety-lock, thereby coming again into engagement with the lever projection 109a which is thus allowed to snap into the keyhole and to enter the key notch 111′, the lever 109 is slightly pushed aside radially outwards to the position shown on FIG. 5 to clear or free the backward or inward way of the bolt and, upon turning the key in the clockwise direction by about 90°, the drive peg 104b moves from the position shown on FIG. 6 to the position shown on FIG. 7 thereby retracting the snap-bolt 105 to its inoperative position through co-operation of said peg with the edge of the circular orifice 105b of said bolt upon overcoming the force exerted by the spring 216. During this inward motion of the snap-bolt, the skew or bevelled side edge end portion 105d of the bolt engages the lever end portion 109″ so as to slidably guide and assist the movement of said lever end portion 109″ out of the slide-way of the snap-bolt 105 until the sliding engagement of said lever with the straight guiding side of the bolt. It should also be noted that the plug assists by the pushing or swinging aside of the lever 109 radially outwards by acting as a cam onto the lever projecting portion 109a while overcoming the force opposed by the spring 110 as shown on FIG. 2. When said plug pushes said latch lever 109 back, i.e. radially outwards, such outward travel of the latch lever needs only be sufficient to clear the adjacent end edge corner of the rear bolt end 105c since thereafter, the latch lever engages the inclined ramp portion 105d which further moves the latch lever outwards.

Of course, when turning the key 111, the electric switch 38 is operated in unison with the plug 27. In the "stop" and "parking" positions, in particular the ignition circuit and the starting circuit are both dead, whereas in and beyond the "run" position, the ignition circuit is completed while the starting circuit remains dead. When turning the key 111 from the "run" position towards the "start" position, the ignition circuit remains closed and the free end 106′ of the torsion spring 106 engages the lug or keeper portion 101a of the casing thereby further stressing the spring until the key reaches the "start" position wherein the starting circuit is caused to be completed. As soon as the key is released, it automatically springs back under the action of the return spring 106 which restores the whole rotary assembly to the "run" position.

When the key has been withdrawn from the safety-lock in its "stop" position thereby causing the lever 109 to be swung or pushed radially inwards by its biasing spring 110 (the lever projecting portion 109a then engaging the keyhole as shown on FIG. 3), this lever 109 as stated hereinabove may act, in the position shown on FIG. 6, as a stop means positively locking the snap-bolt 105, in its fully outward extended operative position, thereby preventing it from being pushed inwards by a force applied from the outside to the nose 105 of the snap-bolt, since the latter then engages by the free terminal face of its rearward end portion 105c, the lower end portion 109″ of the lever 109 and is thereby locked in position.

Alternatively, instead of the bolt-actuating member described herein, this member may consist of a suitable cam operatively connected to the plug 102′ in coaxial relationship therewith and engageable by its lateral cam profile with for example an upstanding flange portion integral with the snap-bolt 105 and located at its innermost or rearward end portion of the bolt, whereas said circular orifice 105b of the bolt could be replaced by an elongated slot extending in the longitudinal direction of the bolt and having a length consistent with the outward and inward stroke of the bolt. Said cam is then provided coaxially with a depending shank or shaft portion extending through the slot provided in the snap-bolt to engage endwise the switch rotor. According to another modification, the torsion spring for returning the rotary assembly from the "start" position to the "run" position may be fitted within the switch motor.

FIG. 9 shows e.g. the various possible angular positions of the key 111 with respect to the top face 26 of the safety-lock, which are successively in the clockwise direction: the "stop" position 71, the "outfits" position 87, the "parking" position 74, the "run" position 73, the "start" position 72.

FIGS. 10 to 17 show an embodiment of the electric switch 38 illustrated on FIGS. 1 and 2. This switch 38 is a drum selector step-switch of the multipolar, single gang, multithrow type for controlling and combining a plurality of electric circuits. The switch comprises a stationary part or stator 55 made of electrically insulating material and formed with a substantially cylindrical cavity or bore for receiving, housing and accommodating a rotary part 56 having substantially the shape of a cylindrical drum or barrel and rotatably mounted within the stator 55, the whole switch being positioned with respect to the body 102 so that the drum or barrel be substantially coaxial with the axis of rotation of the plug 102'. The drum or barrel 56 is formed on its bottom or left end face with a central projection journalled into a corresponding bearing hole of the bottom or left wall of the stator 55 whereas the top or right end face of the drum is formed with a cruciform recess 70, adapted to receive the mating round or cross-shaped end of the pin extension 104a for positively rotating said drum within the stator in either direction. The switch is adapted to control in particular the ignition and starting electrical circuits of the vehicle engine as well as auxiliary circuits. For this purpose the stator 55 includes a plurality of stationary contact pieces or studs which are for example the following:

The contact piece or stud 61, connected to one pole, for example, to the positive pole, of the electric storage battery of the vehicle;

The contact piece or stud 62 connected to the various electric auxiliary equipments or outfits of the vehicle, such as the supply circuit of a radio set, etc.;

The contact piece or stud 63 connected to the ignition or spark coil and to the light circuit, etc.;

The contact piece or stud 64 connected to the same pole of the storage battery as the contact piece 61;

The contact piece or stud 65 connected to the supply or energizing circuit of the starting motor.

These contact pieces are connected to their various associated electric circuits by suitable cables, leads or conductor wires 57 and are protected by an insulating covering or sheath 69 (FIG. 10), so that the contact pieces or studs actually form the terminal clamps or binding posts of the switch. The contact studs 61 to 65 are preferably substantially cylindrical and extend in substantially parallel relation to the axis of rotation of the drum 56. They are arranged in the stator 55 in preferably uniformly spaced relationship along an arc of circumference substantially coaxial with said drum and project with at least a portion of their lateral surface into the cylindrical cavity of the stator, preferably in such a manner that the cylindrical surface, forming the geometrical envelope of and tangent internally to said contact studs, coincides with, or is slightly radially spaced from the lateral outer surface of said drum 56. To this end, that portion of the inner bore of the stator 55 into which project sidewise the contact studs 61 to 65 has a larger radius than that of the drum 56 while being concentric to the latter, so that void spaces or air gaps are left between the radially inwards projecting portions of said contact studs. Owing to these air gaps or void spaces 55a, the switch behaves like an air circuit-breaker thereby avoiding any erosion of the insulating material of the stator which receives the contact pieces, terminals or contact pins or plugs.

The drum or barrel 56, also made of electrically insulating material, includes at least two electrically conducting surface portions resiliently engageable with said contact pieces and having each one a effective circumferential contacting length sufficient to connect two successive contact pieces but insufficient to connect three of them. The number of said electrically conducting surface portions depends upon that of the various possible switching combinations which it is desirable to achieve and said electrically conducting surface portions are so staggered axially and offset circumferentially with respect to each other that one and a same contact piece may be connected to both of the next preceding and the next following contact pieces, respectively, by said electrically conducting surface portions. Each electrically conducting surface portion preferably consists of the operative surface portion of a roller contact and in the case illustrated in the drawings, there are provided three roller contacts 58, 59 and 60 which are housed and slidably mounted for radial displacement in a corresponding recess of the drum 56 wherein they are urged outwards by an associated individual thrust-spring 67. Instead of roller contacts, use can also be made of spherical ball contacts or the like. For better guiding the roller or ball contacts during their radial or transverse sliding motion within their recess wherein they are preferably freely disposed while enabling them to oscillate and to revolve about themselves, an intermediate preferably shaped tappet-forming part 68 is interposed between each thrust-spring 67 and the associated roller or ball contact and slidably mounted in the relevant recess. The bore of the stator 55, receiving the drum 56, is desirably formed with a plurality of longitudinally extending grooves 66 for collecting the dust and dirt therein, so as to avoid any sticking or jamming of the drum 56. Owing to the axial spacing between the recesses receiving the roller or ball contacts and their circumferential staggering, the roller or ball contacts 58, 59, 60, when viewed in the axial direction of the drum, are seen as being offset with respect to each other, in mutually overlapping position whereby they may each one simultaneously engage two contact pieces in the main operating positions. Thus, the switch forms an actual selector, combination or change-over switch the roller or ball contacts of which are pressed by their individual thrust-springs against the contact pieces with which the roller or ball contacts are in rolling engagement due to their capability of rotation about their own axis.

FIGS. 12 to 17 show various relative operating positions of the three roller or ball contacts 58, 59 and 60 of the rotary drum 56 with respect to the stationary contact pieces 61 to 65. Thus, on FIG. 12, the angular position of the drum 56 corresponds to the "stop" position 71 of the plug 102' or key 111 (FIG. 9), so that the roller or ball contacts are outside of the arc of circumference occupied by the contact pieces and are rolling on and along the solid inner wall surface of the bore of the stator 55. Accordingly, no electric contact is thus made, so that all the electric circuits are cut out or open.

On FIG. 13, the selector drum 56 is in a position corresponding to the "outfits" position 87 of the key wherein the roller or ball contact 60 makes the electrical connecting contact between the contact pieces 61 and 62 thereby enabling the supply of electric current to the accessories of the vehicle, such as the radio.

On FIG. 14, the drum 56 is in a position corresponding the "parking" position 74 of the lock, wherein no electric contact is made because the contact piece 61 is set back and cannot be engaged by the roller or ball contacts 58 and 59, whereas as insulating boss 86, filling the space between the radially inwards projecting portions of the contact pieces 62 and 63, prevents the roller or ball 60 from engaging both of said contact pieces.

On FIG. 15, the position of the drum 56 corresponds to the "run" position 73 of the lock when coming from the "stop" position thereof, so that the contact pieces 63 and 64 are electrically connected by their engagement with the roller or ball contact 60 thereby enabling to energize the spark or ignition coil and the contact pieces 63 and 62 are electrically connected by the rollers or balls 59 and 60 simultaneously engaging said contact pieces, thereby enabling the electric supply of the radio for example.

On FIG. 16, the position of the drum 56 corresponds to the "start" position 72 of the lock, wherein the simultaneous engagement of the roller or ball 60 with the contact pieces 64 and 65 enables to achieve the electric supply of the starting motor, whereas the simultaneous engagement of the roller or ball 59 with the contact pieces 63 and 64 results in the electric supply of the spark or ignition coil and of the light circuits.

FIG. 17 shows an intermediate position of the drum 56 during its return motion from the "start" position of the lock. In this position, the roller or ball 59 remains in simultaneous engagement with the contact pieces 64 and 63, thereby allowing to energize the spark or ignition coil. At the end of this return motion towards the "run" position, which is automatically achieved by the torsion spring 106 of FIG. 1, the roller or ball 58 simultaneously engages the contact piece 63 of the ignition circuit and the contact piece 62 of the auxiliary circuits. Due to the switching on and switching off operations through rolling contacts, this switch offers the advantage of substantially reducing the wear of the stationary as well as of the moving contact pieces, thereby increasing the lifetime and reliability of the switch. Moreover, owing to the axial spacing and to the circumferential staggering of the roller or ball contacts, outstanding electrical connections are always achieved even though the contact pieces are oxidized or damaged by electric sparks, more especially as the roller or ball contacts roll while revolving about themselves during their displacements. Alternatively, the roller or ball contacts could be replaced by frictional contact segments in sliding engagement with stationary contact pieces.

Each stationary contact piece or stud preferably consists of a cylindrical tubular terminal plug made from bent or rolled-up metal-sheet, the open inner end of which terminates into a flanged rim forming a clamping collar for being clamped into said stator whereas its open opposite end receives the tag or lug of the connecting leads 57 which are preferably secured by being clamped into a cable grip-like portion of said contact piece.

Instead of locking a steering-wheel spindle or shaft as in FIG. 1, the locking device according to the invention may be affixed in an inaccessible position within a socket provided on the gear-box or on the brake-housing, the snap-bolt being then adapted to engage a bolt keeper such as a perforated plate integral with the gear-shift lever.

It is to be understood that the invention should not be construed as limited to the forms of embodiment herein described and shown which have been given only by way of example since many modifications and variations may be resorted to by those skilled in or conversant with the art within the scope of the invention.

What I claim is:

1. A releasable locking device for selectively securing a movable element against motion and comprising: a tumbler-type cylinder safety-lock including a stationary body formed with a longitudinal bore, a substantially cylindrical rotary plug formed with an axial keyhole and mounted with a close-running fit in the mating bore of said body and a key-responsive, spring-loaded tumbler mechanism housed in said body and engageable with said plug for locking same, whereby said plug is operable only by a removable key for being reversibly turned into any one of several spaced angular set positions from and to a first outgoing locking, so-called "stop" position; an elongated snap-bolt slidably mounted in a fixed structure associated with said safety lock for longitudinal motion between an operative outside projecting locking position and an inoperative inwards retracted position and loaded by a biasing spring urging said snap-bolt towards its operative outwards moved position; a rotary bolt-actuating member operatively connected to said plug and adapted to co-operate with said snap-bolt for retracting same into its inoperative position through rotation of said key from its "stop" position; and spring-loaded bolt-catch means movably mounted in a cavity of said body and urged into a bolt-retaining position to automatically engage a corresponding stop portion on said snap-bolt in the inoperative retracted position of the latter, so as to positively retain same therein at any angular position of the key remaining in said plug, said catch means being provided with a radially projecting portion adapted to protrude into the bore of said body through a corresponding aperture thereof whereas said plug is formed with a peripheral groove registering with said aperture and into which opens said keyhole, whereby said projecting portion is insertable at least partially into said keyhole, said key being engaged by said catch means in said "stop" position and said key having its web back edge, which is oposite to its wards, formed with a notch for receiving said radially projecting portion of said catch means therein when said key is in the keyhole and said catch means is in its released position, whereas the raised edge portion of the key, adjacent to and following said notch towards the tip of the key, is connected to said notch by a sloping rounded portion forming a bolt-triggering off portion of the key, which during withdrawal of said key engages said catch means and causes the latter to be tripped for disengaging and releasing said snap-bolt, said snap-bolt generally extending and being movable substantially at right angles to the axis of rotation of said plug and said bolt-catch means consisting of a rocking lever accommodated in a recess of said body and pivotally connected through a stationary pivot pin thereto, said lever generally extending in at least approximately parallel relation to said axis of rotation for swinging motion in a plane passing through said axis of rotation, one free and substantially straight end of said lever being engageable with a corresponding stop notch provided sidewise in said snap-bolt, in the fully retracted position of the latter; said safety-lock, said bolt-actuating member and said snap-bolt being housed in a common substantially cylindrical casing formed with a longitudinal cavity and with a transverse guideway for said snap-bolt which guideway opens to the outside through a lateral aperture; said snap-bolt being formed with a narrow front locking nose and with an enlarged, flat rear guide portion having two parallel opposite sides slidably engaging said guideway and one of which is formed with said stop notch and merges rearwards into a bevelled end portion serving as a guide ramp for said lever, said rear guide portion of the snap-bolt being formed with a circular through-orifice, extending parallel to the axis of rotation of said plug, whereas said bolt-actuating member consists of an eccentric drive peg extending through said orifice in parallel relation to said axis of rotation and slidably engageable when revolving about said axis with the edge of said orifice in tangential relationship therewith, the eccentricity of said peg being such as to cause full retraction of said snap-bolt in the rearward innermost position of said peg with respect to the inward motion of said snap-bolt; whereas the bolt-biasing spring is a helical thrust-spring engaging by one end thereof a socket-like recess formed in the innermost end face of said snap-bolt and by its opposite end, a flanged cup-shaped spring-chair slidably mounted in a side bore of said casing so as to project outwards therefrom under the thrust of said spring, the flanged portion of said spring chair being adapted to engage, at the end of its outward stroke, mating retaining stop means integral with said casing.

2. A device according to claim 1, wherein said key is removable therefrom in at most two different angular positions only, one of which is said "stop" position.

3. A device according to claim 1 comprising a substantially cartridge-like casing, said body being insertable in said casing wherein it is locked in place by a spring-loaded locking finger slidably mounted in a radial through-bore of said body, the keyhole of said plug opening through an orifice in the lateral surface of said plug substantially on a level with said radial bore and said finger being resiliently urged to enter by one end thereof a corresponding through-hole of the side wall of said casing whereas it is directly engageable by its opposite end with said lateral surface of said plug before leaving said through-hole and adapted to enter said keyhole through said orifice upon being pushed therein when said keyhole registers with said radial bore and said key is removed.

4. A device according to claim 1, wherein said plug is operatively connected to said bolt-actuating member by means of a dog-plate.

5. A device according to claim 1, wherein said drive peg has a substantially oval-shaped cross-sectional contour at least on that portion thereof which extends through said orifice in said snap-bolt.

6. A device according to claim 1, wherein said drive peg forms a stop means limiting the outward stroke of said snap-bolt whereas in the fully outward extended operative position of the latter, said lever is engageable with the innermost end face of said snap-bolt to retain same in said position.

7. A device according to claim 1, comprising a stationary sleeve-like holder the inner wall surface of which is formed with a recess, said casing being insertable in said holder and adapted to be locked therein by engagement of said slidable spring-chair with said recess.

8. A device according to claim 1, wherein said snap-bolt consists of a fabricated stack of joined-up laminations shaped to the contour of said snap-bolt.

9. A device according to claim 1, wherein said cavity of said casing opens to the outside at one end thereof through a bore receiving said safety lock, the body of which is formed at its outer end with a peripheral flange fitting into a corresponding counter-bore of said bore, whereas said drive peg is integral at its end adjacent to said safety-lock, with a stepped barrel portion operatively connected in coaxial relation to said plug and rotatably mounted in a corresponding stepped bore of said cavity whereby said stepped barrel portion bears through a shoulder against an inner collar-like annular flange of said stepped bore.

10. A device according to claim 9, wherein said cavity in said casing opens to the outside through its end opposite to the safety lock and comprising an electric rotary switch for controlling at least one electric circuit, mounted in said open end of the casing and including a stator and a rotor operatively connected to said bolt-actuating member for revolving in unison therewith, said switch being adapted to close said circuit in one determined angular position of said rotor and to open said circuit when said rotor leaves said determined angular position upon moving away therefrom and back towards said "stop" position.

11. A device according to claim 10, wherein said switch is secured to said casing by means of a removable cup-like annular cover through which the switch stator projects at least partially outwards.

12. A device according to claim 10, wherein said switch rotor consists of a disk-shaped element rotatably mounted, in coaxial relation to the axis of rotation of said plug, on a shaft supported by said switch stator, said rotor carrying, on its face adjacent to said stator, moving contact pieces resiliently engageable with stationary contact pieces on said stator.

13. A device according to claim 10, wherein said drive peg is integral, at its end towards said switch, with a cylindrical barrel portion, extending in coaxial relation to the axis of rotation of said plug, through a bore in a transverse partition of the cavity of said casing, into the space containing said switch, said barrel portion being formed endwise with a dog-pin-like projection inserted in a corresponding recess of said switch rotor for turning same.

14. A device according to claim 13, wherein the rotary assembly, consisting of said plug, and key, of said bolt-actuating member and of said switch rotor, may assume by turning said key at least three successive separate angular positions, namely, said locking so-called "stop" position wherein each electric circuit is cut out, an unlocked so-called "run" position wherein said snap-bolt is in its inoperative retracted position and said electric circuit is opened and an unlocked, contact-making so-called "start" position wherein said snap-bolt is in its inoperative retracted position and said electric circuit is closed, a return-spring being provided for urging said assembly back from said "start" position to said "run" position upon release of said key and being stretched only during rotation of said assembly from said "run" position to said "start" position.

15. A device according to claim 14, wherein said switch is adapted to open and close at least two electric control circuits and said rotary assembly may assume an intermediate angular, so-called "idle" position located between said "stop" and said "run" positions and in which said snap-bolt is in its retracted position and both circuits are open, whereas in said "run" position, one circuit is closed and the other open, and in said "start" position, both circuits are closed, said key being freely removable only in said "stop" and "idle" positions, respectively, while it is positively retained in said safety-lock in the two other positions.

16. A device according to claim 14, wherein said return-spring is a helical spring mounted in a corresponding annular groove of said barrel portion in substantially coaxial relation to the axis of rotation of said assembly and held against rotation relative thereto, said spring having one sidewise protruding end freely engageable, in the direction of coiling, with an abutment integral with said casing.

17. A device according to claim 10, wherein said switch is a multipolar, single gang, drum selector step-switch for controlling and combining a plurality of electric circuits, the stator of which is made of electrically insulating material and is formed with a substantially cylindrical cavity accommodating the rotor and comprises a plurality of stationary contact studs affixed in said stator and arranged in parallel spaced relationship along an arc of circumference substantially coaxial with said rotor, said contact studs being parallel to the axis of rotation of said rotor and projecting with at least a portion of their lateral surface into said cylindrical cavity of the stator, whereas said rotor consists of a barrel made of electrically insulating material and including at least two electrically conducting surface portions resiliently engageable with said contact studs and having each one an effective circumferential contacting length sufficient to connect two successive contact studs but insufficient to connect three of them, said electrically conducting surface portions being so staggered axially and offset circumferentially with respect to each other that one and a same contact stud may be connected to both of the next preceding and next following contact studs, respectively, by said electrically conducting surface portions.

18. A device according to claim 17, wherein each one of said electrically conducting surface portions is slidably mounted for radial displacement in a corresponding recess of said barrel and urged outwards by an associated individual spring.

19. A device according to claim 18, wherein each electrically conducting surface portion consists of the operative surface portion of a roller contact.

20. A device according to claim 19, wherein each roller contact is guided by an intermediate part, slidably mounted in the relevant recess of said barrel and interposed between said roller contact and its associated spring.

21. A device according to claim 16, wherein the cylindrical surface, forming the geometrical envelope of, and tangent to said contact studs, is radially spaced from said barrel.

22. A device according to claim 17, wherein each contact stud consists of a cylindrical tubular plug made of bent, rolled-up metal sheet, the open inner end of which terminates into a flanged rim forming a crimping collar for being clamped into said stator, whereas its open opposite end receives the tags of the connecting leads.

23. A device according to claim 17, wherein the cylindrical surface of the cavity of said stator is formed with a plurality of circumferentially spaced longitudinal grooves.

24. A device according to claim 23, for locking a steering-wheel spindle mounted in a steering-column and comprising a socket-like holder integral with said steering-column for receiving said casing therein, said snap-bolt being insertable into a slotted bolt-clasp integral with said steering-wheel spindle.

References Cited

UNITED STATES PATENTS

| | | | |
|---|---|---|---|
| 1,942,087 | 1/1934 | Cooper | 70—134 |
| 2,039,244 | 4/1936 | Lowe | 70—368 |
| 2,489,484 | 11/1949 | Dyson | 70—38 |
| 2,707,385 | 5/1955 | Fisler | 70—134 |
| 2,868,007 | 1/1959 | Neiman et al. | 70—252 |
| 3,448,599 | 6/1969 | Schreiber | 70—371 |

FOREIGN PATENTS

| | | |
|---|---|---|
| 1,022,858 | 3/1966 | Great Britain. |

RICHARD E. MOORE, Primary Examiner

R. L. WOLFE, Assistant Examiner

U.S. Cl. X.R.

70—368, 451